Oct. 14, 1958

F. W. GREER ET AL 2,855,893

BREADING MACHINE

Filed July 27, 1955

Inventors:
Fred W. Greer,
William Hill,
Lawrence W. Kinney,
by Rowland V. Patrick
Attorney

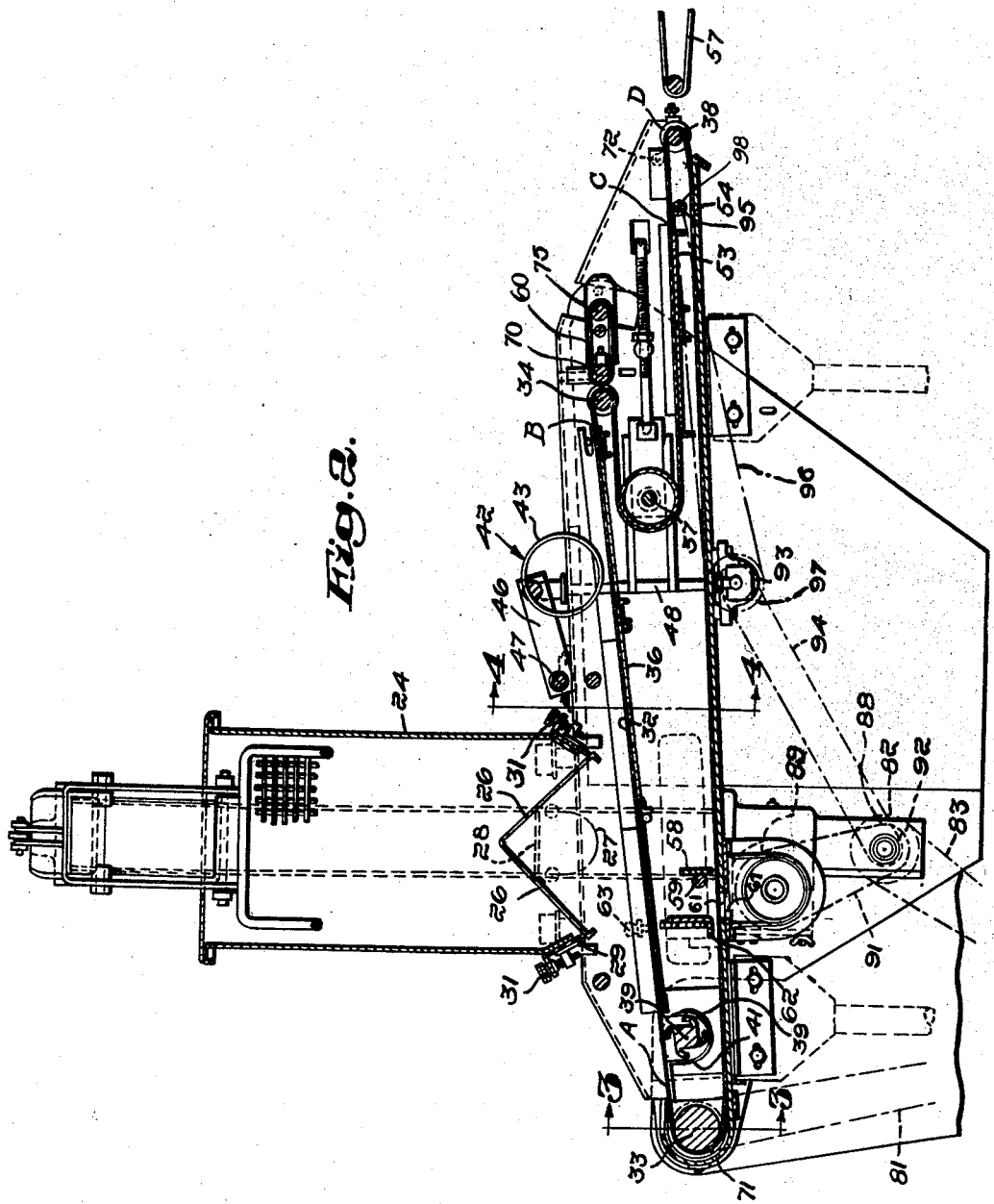

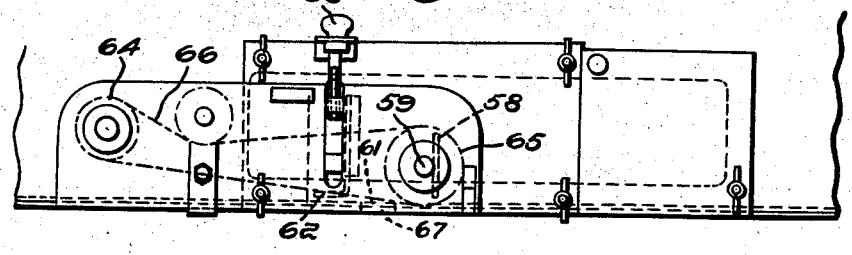
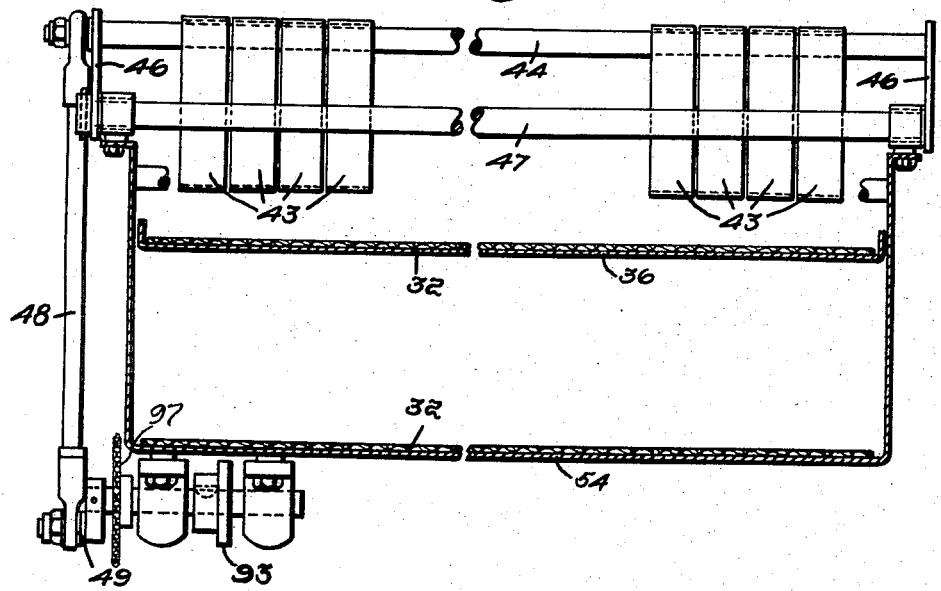
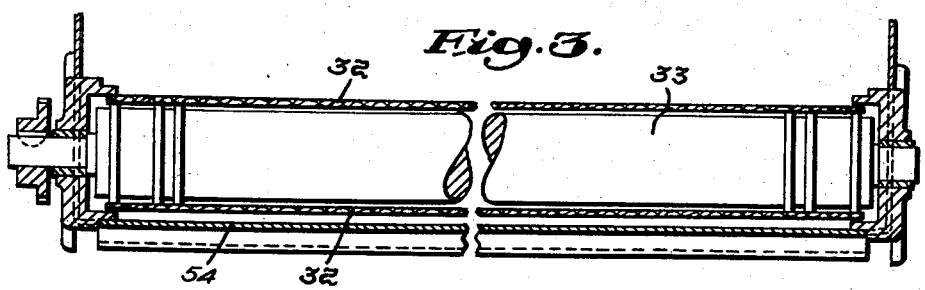

United States Patent Office 2,855,893
Patented Oct. 14, 1958

2,855,893

BREADING MACHINE

Fred W. Greer, South Lincoln, William Hill, Belmont, and Lawrence W. Kinney, Winchester, Mass., assignors to J. W. Greer Company, Wilmington, Mass., a corporation of Massachusetts Application July 27, 1955, Serial No. 524,648

12 Claims. (Cl. 118—16)

This invention relates to apparatus for applying an overall coating of comminuted material to various products, and more particularly it relates to a breading machine for food products, such as fish sticks, fish fillets, croquettes, shrimp, oysters, chicken, hamburg, and so forth. The general object and purpose of the invention is to provide a machine which will apply a coating of bread crumbs or the like to a food product in a more rapid and economical manner than can be done by hand or with any other machine known to us, and which is therefore adapted to be used in a food processing plant in conjunction with battering machines and frying machines for example.

In general our apparatus includes a conveyor to advance the products to be coated and means to provide on a first traverse of the conveyor, a layer of comminuted material of predetermined depth to underlie the products. Disposed above the first traverse is a hopper for discharging additional comminuted material over the advancing products so as to cover them substantially completely, and adjacent the hopper, there are provided means for pressing comminuted material against the products preferably both from above and below so to cause the material to be firmly embedded therein. The conveyor itself comprises an open mesh belt which, during the greater portion of its initial traverse, runs over a plate which serves to maintain the comminuted material on the conveyor but which terminates before the end of the initial traverse of the belt to permit the comminuted material to fall through the belt onto additional conveyor means. The latter, in turn, receives the products at a further point of its advance as they tumble off the belt, and thereafter a final separation of the comminuted material and the products is effected so that surplus material can be returned for reuse preferably along a return traverse of the belt. The surplus material is then measured into a layer of suitable thickness for continuous presentation to the initial forward traverse of the belt.

The novel features of the invention, together with further objects and advantages thereof, will become more readily apparent when considered in connection with the accompanying drawings in which:

Fig. 2 is a side view of the machine according to this invention in section;

Fig. 3 is a sectional view taken on line 3—3 of Fig. 2;

Fig. 4 is a sectional view taken on line 4—4 of Fig. 2; and

Fig. 5 is a sectional view on an enlarged scale of the gate and de-lumping paddle shown in Fig. 2.

Figure 1:
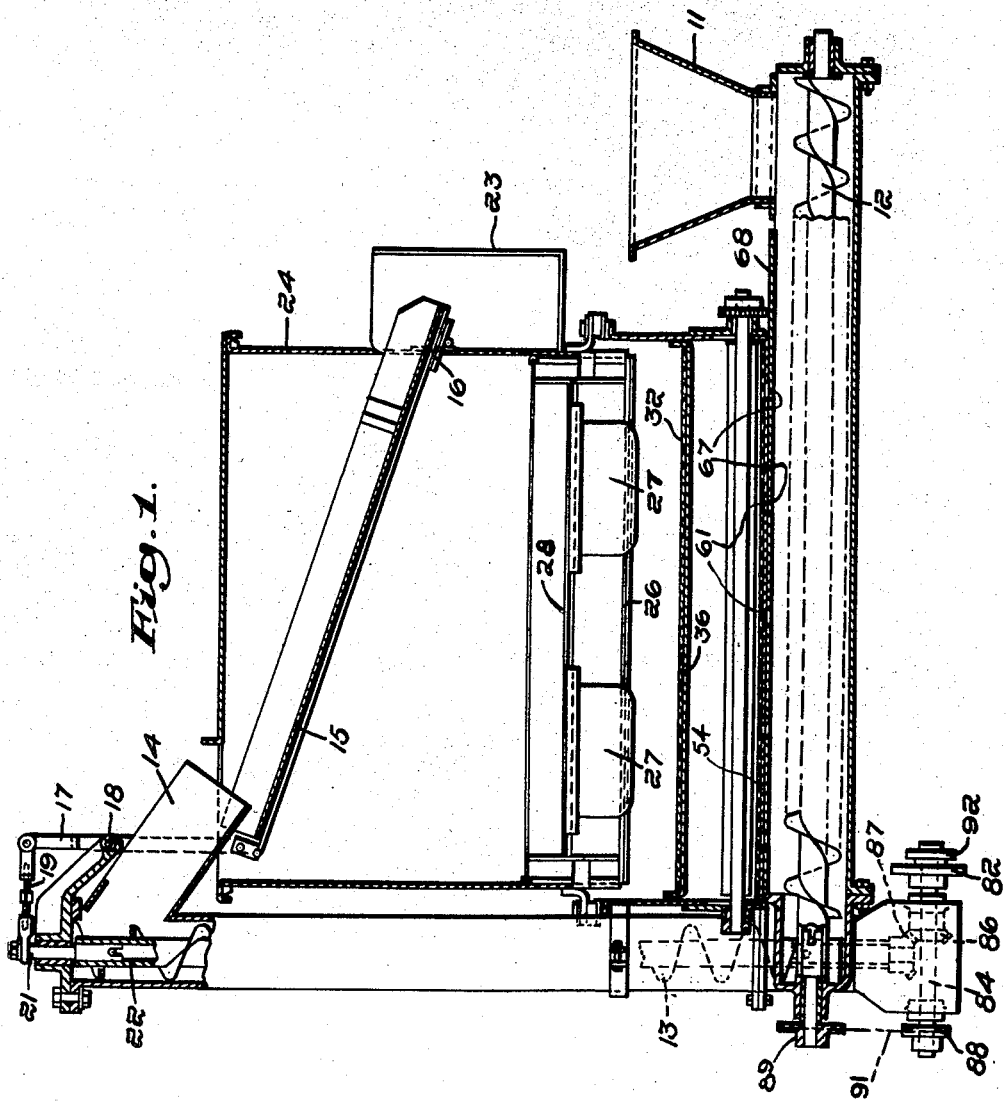
Fig. 1 is an end view of the machine according to this invention in section.

Referring now to the drawings, and more particularly to Fig. 1, it will be observed that there is included in the machine of our invention a loading hopper 11 wherein the breading material or bread crumbs are placed, and through which the material passes to a horizontal screw conveyor designated by the numeral 12. Horizontal screw conveyor 12 feeds the breading material to a vertical screw conveyor 13, located at the left of Fig. 1, which in turn elevates the material and then discharges it into an inclined chute 14. Beneath the lower end of chute 14, there is provided an inclined screen 15, adapted to be vibrated back and forth. The end of the screen towards the right of Fig. 1 rests on a fixed frame member 16 and the left end of the screen is pivotally joined to a vertical rocker arm 17 pivoted about an intermediate axis 18, and having its end remote from the screen pivotally joined to a connecting rod 19. Connecting rod 19 in turn reciprocates horizontally by virtue of its pivotal connection to an eccentric shaft 21 projecting from the end of shaft 22 which forms a part of the vertical screw conveyor 13. By vibrating the screen, most of the bread crumbs are caused to fall through the screen, the few lumps that are unable to do so being shaken down the screen into a lump pan 23 disposed beneath the lower end of the screen.

Surrounding the major portion of the screen is a discharge hopper 24, somewhat larger than loading hopper 11, the former being provided with pitched or inverted V-shaped bottom walls 26 whose extreme edges are spaced a short distance from the side walls of the hopper whereat there are formed a pair of exit chutes or passages. To maintain the discharge flow of breading material from the exits, the walls 26 are vibrated at a relatively high frequency such as 60 cycles per second by means of a pair of magnetic vibrators 27 connected to a source of alternating current (not shown). Specifically, vibrators 27 are fastened to a horizontal member 28 bridging the V-shaped legs of the bottom walls of the hopper as best shown in Fig. 2.

Referring now to Fig. 2, it will be observed that the amount of breading material exiting from the the discharge hopper may be regulated by a pair of adjustable slides 29 projecting from the respective end walls of the discharge hopper 24 adjacent its bottom walls. Adjustment of each slide is accomplished by thumb screws 31. Beneath the exit passages from the discharge hopper, there is a slightly inclined conveyor in the form of an endless stainless steel mesh belt 32 driven by roll 33 located at the left of Fig. 2 and shown in cross section in Fig. 3. Belt 32 is supported between roller 33 and another roll 34 towards the right of Fig. 2 by an underlying plate 36 of stainless steel over which the belt travels. After passing around roll 34, the belt reverses direction and goes around a take-up roll 37, and once again reverses in direction to be engaged by a roll 38. The return traverse of the belt is from roll 38 to drive roll 33 from right to left in the Fig. 2. To properly tension the belt, roll 37 is adapted to be moved towards the left of Fig. 2 to take up the belt as required. Since this may be done in any convenient manner well known to those skilled in the art, this mechanism of the present embodiment has not been illustrated in detail.

The food products to be coated or breaded are deposited on the upper forward traverse of the belt 32 at a point designated by the letter A, and thereafter are passed over a bottom patter or paddle wheel 39. Patter 39, as shown, has four paddles which are rapidly rotated in a clockwise direction, within a transverse U-shaped channel 41 below the belt. As will appear, there is maintained a cover of about ¼ to ⅜ inch depth of breading material on the belt, a part of which falls into the U-shaped channel so that it is kept substantially full with breading material. By means of the paddles of the patter 39, breading material is continuously dispersed against the under portions of the food products, as they pass over the patter, with sufficient force to firmly embed the breading material in the products. Thereafter the remaining portions of the products twice receive a coating of breading material from above, by virtue of the continuous discharge of the material from the two spaced exit passages in the discharge hopper 24. As the product, which is then completely surrounded by breading material on the sides, bottom and top, travels along the belt, it next encounters a top patter 42 consisting of a series of circular spring steel hoops 43 which are adapted to reciprocate vertically, the intermittent pressure of the hoops on the products firmly embedding the breading material in the remainder of the products so that it cannot be shaken off.

The manner in which hoops 43 are reciprocated is best shown in Fig. 4. Referring now to Fig. 4, it will be observed that all of the hoops are rigidly fastened to a cross bar 44 which is in turn connected at each end to a pair of pivot arms 46 mounted on a shaft 47. To one end of cross bar 44 there is also pivotally connected a crank arm 48 having its end remote from cross bar 44 rotatably mounted on a crank shaft 49. Crank shaft 49 is driven by a sprocket 92 and a chain 94 (Fig. 2) as will be described in more detail in the description of the drive linkages of the apparatus of the invention.

After passing under the hoops of the top patter 42, the product is separated from the surplus material surrounding it, and not embedded therein, at a point designated by the letter B whereat the plate 36 terminates. That is to say, most of the breading material falls through the wire mesh belt and is collected on the lower forward traverse of the belt which is provided with an underlying support plate 53. The product, on the other hand, passes onto another relatively short open mesh belt 60 and then tumbles onto the breading material collected on the sub-section of the belt 32 above plate 53, any excess breading material being shaken off the product as a result of the fall. Belt 60 has associated therewith a pair of rolls 70 and 75, the former being driven through roll 34 and the later being vertically adjustable so that the height of the fall of the products may be varied as is necessary to cause them to turn over completely during their fall. At the end of plate 53, as designated by the letter C, the breading material is again permitted to fall through the belt 32, and is collected by the lowest or return traverse of the belt in combination with a backing plate 54 thereunder. However, the products continue along until discharged by roll 38 at a point D, their surface coating having been completed. Towards the right hand extremity of Fig. 2, there is illustrated a portion of a second conveyor belt 57 onto which the products may be discharged if desired. Belt 57 might form a part of a frying machine, for example, for further continuous processing of the product preparatory to freezing. Alternatively, if the product is to be packed and frozen immediately, the product may be discharged onto a small packing table at this point.

The surplus breading material carried by the lowest reach of the belt 32 moves towards the left of Fig. 2, and any lumps that have formed therein are broken up by what might be termed a de-lumping paddle (shown in larger scale in Fig. 5), consisting of a plate 58 rigidly attached to a shaft 59. Just beyond de-lumping paddle 58 is a series of slots 61 formed in plate 54 and communicating with the horizontal screw conveyor. Thereafter a dam or gate 62 is provided, the latter being adapted to be moved up or down by means of thumb screws 63. This section of the machine according to the invention, that is the portion which includes the gate 62, slots 61 and the de-lumping paddle 58, is shown on the enlarged scale in Fig. 5 wherein it will be observed that the bottom patter is provided with a drive sprocket 64 connected by a chain 66 to a sprocket 65 on the de-lumping paddle shaft 59 to drive the latter through the former. As seen somewhat better in Fig. 1, slots 61 are adapted to register with a corresponding series of slots 67 formed in a plate 68 which is disposed beneath the belt support plate 54. Plate 68 is arranged so that it may be moved back and forth beneath plate 54 whereby the apertures 61 and 67 may be more or less aligned in order to regulate the amount of breading material passing therethrough to the horizontal screw conveyor. The position of gate 62 likewise affects the amount of breading material returned to the conveyor by controlling the amount of material carried past the gate by the belt. Accordingly, both the gate and the plate 68 are adjusted with a view toward insuring that just the proper amount of breading material continues along the belt for initial breading of the products at point A. As previously mentioned, it is desirable to have approximately a ¼ to ⅜ inch depth of breading at point A, and this is afforded by the provision of a semi-circular cover 71 coextensive with support plate 54 to keep the breading material on the belt as it passes around roll 33. If too much breading material is permitted past the gate, it will become jammed between cover 71 and the roll, causing the machine to stall. Toward the right of Fig. 2 near the discharge end of the machine is an eccentric shaft 95 which vibrates the wire belt in order to insure that substantially all the surplus material is dislodged therefrom. Eccentric shaft 95 is driven at a fairly high rate of speed as has been found most desirable, and for this purpose, there are provided a relatively small sprocket 98 on the shaft 95, a much larger sprocket 97 on the shaft 49 and a chain 96 interconnecting the sprockets. As an additional aid in the removal of the surplus material from the belt, if necessary there is also a series of triangular cam-like members 72 coaxially mounted on a rod which serve to snap each passing strand of the belt. It follows, therefore, that substantially no surplus breading material is permitted to continue so far as the roll 38 to be wasted.

Motive power in the machine according to the invention is furnished by an electric motor (not shown) which drives the roll 33 through a speed reducing gear box, the output shaft of the gear box being coupled to the roll by means of a chain and sprocket arrangement. The chain is shown in dotted outline in Fig. 2 as indicated by the numeral 81. The horizontal and vertical screw conveyors, on the other hand, are driven through a jack shaft and a right angle drive shaft 84 coupled thereto by a chain 83 and sprocket 82 carried by the shaft 84. Also carried by the latter is a bevel gear 86 in mesh with a bevel gear 87 mounted on the shaft of the vertical screw conveyor; and a sprocket 88 connected to a sprocket 89 on the horizontal screw conveyor shaft by a chain 91. Adjacent sprocket 82 (Fig. 1) on the shaft 84 is still another sprocket 92 for driving the crank shaft 49 through chain 94 and sprocket 93 associated with the top patter. The bottom patter is driven directly from the jack shaft (not shown).

It should be understood, in this regard, that the various moving elements of the machine are susceptible of being driven in different ways, the arrangements shown being merely illustrative of a convenient and expeditious way to provide drive linkages between the elements and the motor as is required to effect the stated object of the invention. Similiarly, the conveying operation, particularly as regards tumbling the products onto a fresh layer of breading material, might be achieved with a pair of belts in place of the belt 32, one of which begins at a point beneath the trailing end of the other. No doubt various other modifications of the preferred embodiment of our invention which are within the spirit and scope of the invention will occur to those skilled in the art, and therefore, our invention should not be deemed to be limited to the precise embodiment illustrated but rather should be deemed to be limited only by the scope of the appended claims.

What is claimed is:

1. Apparatus for applying comminuted material to food products and the like including an open mesh conveyor, a plate underlying a traverse of said conveyor for supporting a continuous layer of comminuted material to be carried along said traverse by said conveyor and onto which layer the products are deposited, a channel below said plate extending transversely thereacross, means in said channel for urging comminuted material tending to drop into the channel from said layer back upwardly through the conveyor towards and against the undersides of products carried across said channel to embed the material in the undersides of the products and to maintain the continuity of said layer on said plate beyond said channel, means disposed above said traverse beyond said channel for discharging said material over said products as they are carried along by said conveyor, and means beyond said discharge means to embed the material discharged from the latter into said products.

2. Apparatus of the character described, comprising open mesh conveyor means providing a pair of forward overlapping traverses, a plate underlying the upper of said forward traverses to maintain comminuted material on said upper traverse, said plate terminating short of the end of said upper forward traverse at a point above the lower of said forward traverses, and a plate underlying said lower forward traverse, whereby comminuted material carried by said conveyor means falls therethrough onto said lower forward traverse, whereas products carried by the conveyor means tumble at the end of said upper forward traverse onto the layer of comminuted material formed on said lower forward traverse with the material from said upper traverse.

3. Apparatus as claimed in claim 2 wherein the plate underlying the lower of said forward traverses terminates in advance of the end of said lower forward traverse, whereby loose comminuted material carried by said lower forward traverse cascades through said mesh onto a return traverse of said conveyor means.

4. Apparatus as claimed in claim 3 having means positioned along said return traverse to remove some of the comminuted material therefrom and to form a layer of predetermined depth to underlie the products received near the beginning of the forward traverse and means to maintain the layer of predetermined depth on the conveyor in the transition region between the return traverse and the first forward traverse.

5. Apparatus for applying comminuted material to food products and the like including an open mesh conveyor, a plate underlying a traverse of said conveyor for supporting a continuous layer of comminuted material to be carried along said traverse by said conveyor and onto which layer the products are deposited, a U-shaped channel below said plate extending transversely thereacross, a paddle wheel disposed in said channel with the outer extremities of the paddles closely adjacent the inner peripheral surface of the channel to urge comminuted material tending to drop into the channel from said layer back upwardly through the conveyor towards and against the undersides of products carried in said layer along said traverse means disposed above said traverse beyond said channel for discharging comminuted material over said products as they are carried along by said conveyor, and means beyond said discharge means for embedding the comminuted material discharged by the latter into said products.

6. Apparatus as claimed in claim 5 wherein said last-named means beyond said discharge means comprises a series of reciprocating spring steel hoops for pressing comminuted material surrounding said products against and into the same.

7. Apparatus for applying comminuted material to food products comprising: an endless open mesh conveyor belt having a pair of overlapping forward traverses and a return traverse beneath said forward traverses, means underlying each traverse to support comminuted material carried by the belt, a hopper disposed above said first traverse to discharge comminuted material over products advanced by the belt, and a reciprocating top patter to embed material thus discharged into the products advancing in the forward traverse of the belt, said first-named means terminating in advance of the ends of each of said forward traverses to permit said material to fall from the first to the second forward traverse before the products, and to permit the material to fall from the second forward traverse to the return traverse before said products are discharged from the belt at the end of said second forward traverse and means to maintain the comminuted material on the belt in the transition region between the return traverse and the first forward traverse to provide a layer of comminuted material to underlie products deposited at the starting end of said first forward traverse.

8. Apparatus as claimed in claim 7 including a bottom patter disposed beneath the first of said forward traverses in advance of said hopper to embed comminuted material in the undersides of said products.

9. Apparatus as claimed in claim 8 including a transverse gate disposed above said return traverse to limit the amount of material carried therebeyond, said support means underlying said return traverse being apertured in advance of said gate to permit excess material to fall through the belt.

10. Apparatus as claimed in claim 9 including a screw conveyor to return the excess material to said hopper.

11. Apparatus for applying comminuted material to food products comprising: an endless open mesh conveyor belt having a pair of overlapping forward traverses and a return traverse beneath said forward traverses; a plate underlying each of said traverse to support comminuted material carried by the belt, a bottom patter consisting of a paddle wheel disposed in a transverse channel beneath the first forward traverse of the belt, said patter urging comminuted material upwardly through the belt so that it becomes embedded in the undersides of products advancing along the belt; a hopper disposed above said first traverse beyond said bottom patter to discharge comminuted material onto the belt in an amount sufficient to completely cover the products; a reciprocating top patter consisting of a series of resilient hoops to press the material so discharged into the remainder of the products, the excess material carried in said first forward traverse being permitted to fall through the belt to the second forward traverse and thence to said return traverse; a gate disposed above said return traverse to limit the amount of material carried therebeyond, the excess material being permitted to fall from the belt through apertures provided in said plate in advance of the gate; and a cover member and plate respectively overlying and underlying the belt in the transition region between said return traverse and said first forward traverse to retain on the belt the layer of material carried past the gate whereby at the start of said first forward traverse there is provided a layer of comminuted material of predetermined thickness as determined by the spacing between the belt and the gate.

12. Apparatus for applying comminuted material to food products and the like including an open-mesh conveyor, a plate underlying a traverse of said conveyor for supporting a continuous layer of comminuted material to be carried along said traverse by said conveyor and onto which layer the products are deposited, means disposed beneath said traverse for embedding comminuted material in said layer into the undersides of the products, means disposed above said traverse beyond said last-named means for discharging comminuted material over the products as they are carried along by said conveyor, and means beyond said discharge means for embedding the material discharged from the latter into said products.

(References on following page)

References Cited in the file of this patent

UNITED STATES PATENTS

| Number | Name | Date |
|---|---|---|
| 717,970 | Carlson | Jan. 6, 1903 |
| 1,189,002 | Savy | June 27, 1916 |
| 1,711,716 | Bausman | May 7, 1929 |
| 1,734,103 | Woolf | Nov. 5, 1929 |
| 1,801,992 | Becht | Apr. 21, 1931 |
| 1,810,681 | Savy et al. | June 16, 1931 |
| 1,966,268 | Steffen | July 10, 1934 |
| 2,081,888 | Birdsall | May 25, 1937 |
| 2,300,396 | Bookidis | Nov. 3, 1942 |
| 2,347,164 | Petrilli | Apr. 18, 1944 |
| 2,659,338 | Harrison | Nov. 17, 1953 |
| 2,659,339 | Harrison | Nov. 17, 1953 |
| 2,666,410 | Budny | Jan. 19, 1954 |